May 10, 1949.   L. L. JONES ET AL   2,469,392
CAN SOLDERING METHOD AND APPARATUS
Filed Nov. 5, 1946
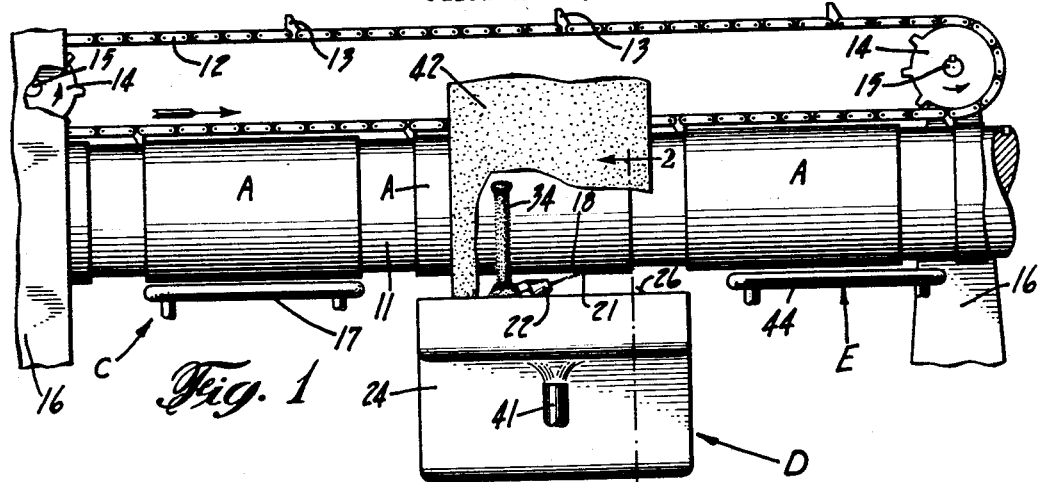
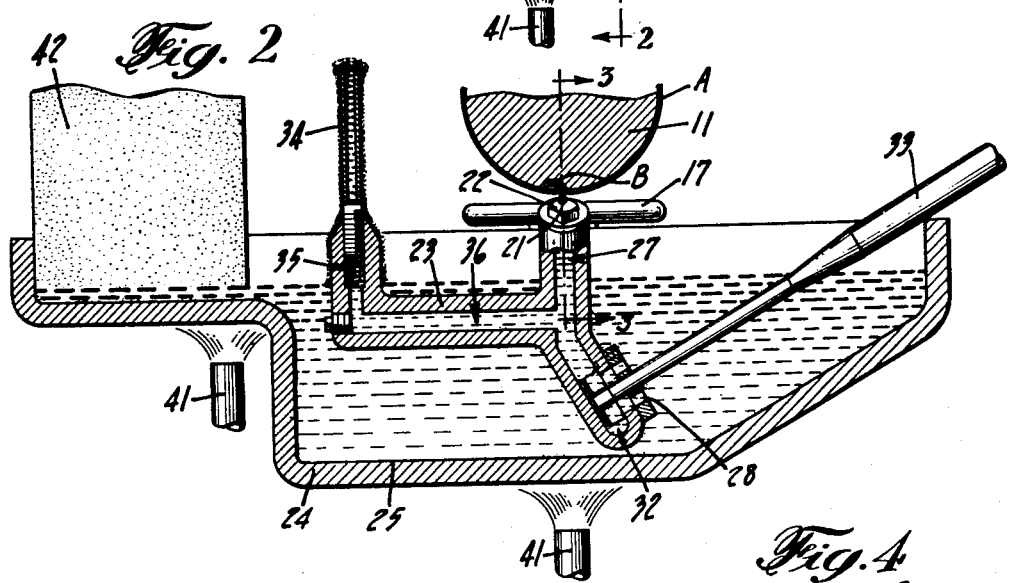
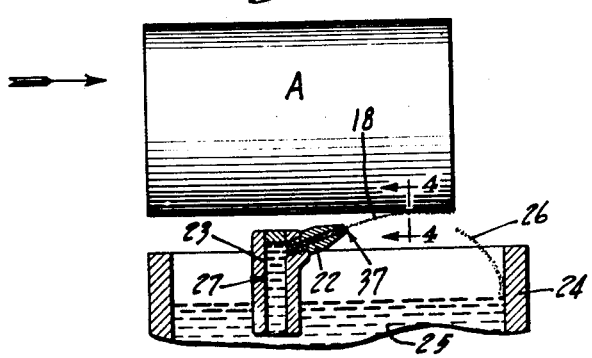
INVENTORS
Lyman L. Jones
Alan D. Nystrom
BY Ivar D. Stensberg
Charles H. Kuna
ATTORNEYS Patented May 10, 1949

2,469,392

UNITED STATES PATENT OFFICE 2,469,392

CAN SOLDERING METHOD AND APPARATUS

Lyman L. Jones and Johan B. Ystrom, Seattle, Wash., assignors to American Can Company, New York, N. Y., a corporation of New Jersey Application November 5, 1946, Serial No. 707,876

5 Claims. (Cl. 113—112)

This invention relates to a method and apparatus for soldering can bodies or similar tubular objects and has particular reference to soldering the seams or joints of can bodies by moving the body seams or joints past a controlled jet of molten solder thereby depositing a predetermined amount of solder upon said seams or joints.

An object of the invention is the provision of a method and apparatus for soldering the seams or joints of metallic can bodies by trajecting a thread of molten solder of predetermined volume into the seam or joint so as to render it unnecessary to remove any excess solder from the seam by wiping or otherwise and also preventing solder being thrown into the interior of the container.

Another object of the invention is the provision of such a method and apparatus wherein can bodies having seams or joints are advanced along a predetermined path of travel to contact the crest of a trajectory jet of molten solder for depositing a predetermined amount of solder into the seams or joints.

A further object of the invention is the provision of a can body soldering apparatus wherein the side seams or other seams of the can bodies are moved through a projected trajectory of molten solder having a velocity substantially equal to the speed of the movement of the seams so that a predetermined amount of solder is deposited in the seams.

Another object of the invention is the provision of a seam soldering method and apparatus for can bodies wherein a round thread of molten solder of predetermined amount is applied directly upon the whole length of the seam groove of a preheated and fluxed can body so that no excess solder is deposited and no wiping of the seam is required.

A further object of the invention is the provision of such a method and apparatus wherein fluxed and heated can bodies are advanced through a trajectory of molten solder for depositing a thread or string or ribbon of solder of predetermined volume into the seam groove, which is then reheated to melt the solder and sweat it into the seams of the can bodies, thereby preventing any solder entering the inside of the can bodies.

A still further object of the invention is the provision of such a soldering apparatus and method whereby both the apparatus and method are not only greatly simplified by the elimination of the usual wiper mechanism and solder roll but also the width of the solder applied to the seam is reduced to a minimum permitting fuller body lithographing and enameling of such can bodies.

Numerous other objects and advantages of the invention will be apparent as it is better understood from the following description, which, taken in connection with the accompanying drawings, discloses a preferred embodiment thereof.

Referring to the drawings:

Figure 1 is a diagrammatic view of a can body soldering apparatus disclosing a preferred embodiment of the present invention with parts broken away;

Fig. 2 is an enlarged sectional view taken along the lines 2—2 in Fig. 1;

Fig. 3 is a sectional view taken substantially along the line 3—3 in Fig. 2;

Fig. 4 is a fragmentary sectional view on an enlarged scale taken along the line 4—4 in Fig. 3 and showing a thread of solder deposited in the entrance of the side seam of a can body; and Fig. 5 is a view similar to Fig. 4 illustrating the side seam following its reheating for melting and sweating the solder into the side seam.

As an exemplary embodiment of the present invention the drawings disclose a can soldering apparatus for soldering the side seams of tubular can bodies A having a longitudinal interlocked side seam B as the bodies are advanced successively along a horn 11. Such a horn may be separate or an extension of a body forming horn of a can body forming machine with which the present invention may be associated. It is to be understood, however, that the present invention is equally adaptable to the soldering of seams or joints other than side seams.

In the case of soldering side seams, can bodies A are delivered onto the horn in any suitable manner and are advanced individually therealong by an overhead conveyor chain 12 provided with spaced feed fingers 13. Such a conveyor is of the endless chain variety and passes over sprockets 14 mounted on horizontal shafts 15 carried in bearings in frame extensions 16 which are mounted on the main machine frame in any suitable manner. One of the sprockets 14 may constitute a driving sprocket for operating the conveyor chain 12 (Fig. 1).

Can bodies A upon being delivered onto the horn 11 preferably are in a fluxed condition ready for soldering with the can body side seam B located at the bottom (Fig. 2) or alternatively a fluxing station could be added to the apparatus preferably in advance of the preheating station. As the can body A moves along the horn it passes over a heating unit 17 located below the horn at a preheating station C which preheats the can body A along the whole region of the side seam B. The preheated and fluxed can body A thereafter continuously advances along the horn 11 to a solder applying station D at which station molten solder is applied to the heated side seam, which travels in exact alignment with the solder applying mechanism.

As a can A moves into position at station D the side seam B comes in contact with the crest of a trajectory 18 of molten solder which is projected into the longitudinal path of travel of the can body A for depositing a string, thread or band of molten solder in the side seam. The thread of solder 21 preferably is of a predetermined volumetric dimension which is effected by the size of the nozzle opening in a nozzle 22 (Fig. 3) and by the timed and spaced relation between the can bodies and the trajectory of molten solder. Preferably the nozzle 22 is facing the line of travel of the can bodies, is positioned at an acute angle to the said line of travel and the pressure behind the molten solder is so regulated or controlled that the speed of solder particles in the trajectory is substantially equal to the speed of travel of the can bodies.

The nozzle 22 is mounted in a supply manifold 23 located in a solder pot or reservoir 24 (Figs. 2 and 3) and preferably is disposed at an acute angle to the line of travel of the can bodies to project the solder upward above the surface of molten solder of a solder bath 25 which is carried in the pot 24. The solder pot 24 may be mounted in any suitable manner at station D on the main frame of the machine.

The path of the trajectory 18 is confined within the pot 24 so that in the event no can is in position for soldering, the molten solder will return to the solder bath. Thus, as the moving can advances into position at station D, the thread of solder 21 flows into the groove of the side seam B along the whole length of the can body and as the side seam is in heated condition the solder deposited therein is not chilled but remains molten during its deposition. An unused portion of the trajectory appears as at 26, striking against a side wall of the solder pot 24 and returning to the solder bath 25.

A supply of molten solder is forced through an outlet 27 in the manifold by means of a centrifugal pump 28 located in a bore 32 in the manifold 23. Such a pump is mounted at the lower end of a drive shaft 33 which extends down into the molten solder and which may be operated from its upper end in any suitable manner.

The centrifugal pump 28 preferably is operated to maintain a constant pressure of solder flowing through the nozzle so that the crest of the trajectory defining a desired curve of the molten solder contacts the passing can body at a predetermined location. The constant pressure at the nozzle is assured by means of an overflow pipe 34 secured in an overflow outlet 35 which has communication with the nozzle outlet 27 by means of a bore 36 (Fig. 2).

Overflow pipe 34 preferably is of a predetermined length to control the pressure and the resultant radius of the desired curve of projected molten solder. Overflow pipe 34 may be adjustably secured in the manifold 23 so that a predetermined head is maintained above a nozzle opening 37 in the nozzle 22. This gives the molten solder in the trajectory a desired forward velocity which preferably is substantially equal to the speed of the advancing can body. It is evident from perusal of the drawings that a constant supply of molten solder thus is forced through the nozzle opening 37 at a predetermined nozzle pressure and to a predetermined level or height, thus assuring that no solder is thrown into the interior of passing can bodies irrespective of the spacing between successive can bodies.

Suitable temperature control means 41 (Figs. 1 and 2) are associated with the solder pot 24 and are disposed below it for maintaining the supply of solder bath 25 in a molten condition. A bar of solder 42 may also be located in the solder pot 24 for replenishing the supply of molten solder in the bath.

As the can bodies A move through the station D the thread of solder 21 is disposed in the groove of the side seam B, as best illustrated in Fig. 4. Such soldering of the side seam may be satisfactory in many instances in the art of making can bodies but it may be desirable in certain cases to flow and distribute the thread of solder 21 into the interstices of the side seam. This may be performed by means of a re-heating operation which melts the thread of solder 21 for bonding the folds identified by the numeral 43 of the side seam together as illustrated in Fig. 5. This operation may be performed at a station E (Fig. 1) as the can bodies A more over a heating unit 44 located beneath the horn 11.

The can bodies thereafter are discharged in the conventional manner from the right hand end of the horn 11 as viewed in Fig. 1 to any convenient place of deposit.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. An apparatus for soldering the side seams of metallic can bodies, the combination of a horn for guiding can bodies horizontally with their seams at the bottom, a solder reservoir located beneath said horn for holding molten solder, means for heating the solder in said reservoir, a nozzle connected with and located in said reservoir for discharging molten solder upwardly into space and along a plane passing through the axis of said horn, feeding devices for advancing can bodies at a predetermined rate of travel along said horn and in the same general direction of said solder discharge, and projecting means located in said reservoir for forcing molten solder through said nozzle at a predetermined pressure to cause the crest of the solder trajectory to reach into and be tangent with the path of travel of the side seams of said advancing can bodies said projecting means imparting to the solder stream a velocity substantially equal to the advancement of said can bodies on said horn whereby the solder extracted from the stream of solder is deposited in the passing can body seams.

2. The method of soldering joints of metal articles, comprising in combination, the steps of providing a supply of molten solder, projecting a jet of molten solder into space from said solder supply along a uniform path, and feeding the articles into solder receiving position adjacent said solder supply by passing the joint to be soldered in the general direction of and through the trajectory of solder the trajectory being substantially tangent to the path of the seam to deposit a thread of solder in the joint.

3. The method of soldering the seams of sheet metal containers, comprising in combination, the steps of providing a supply of molten solder, projecting a jet of molten solder into space from said solder supply, maintaining a uniform trajectory of solder, and feeding a sheet metal container into solder receiving position adjacent said solder supply by passing the seam to be soldered in the general direction of and substantially tangent to the solder stream to deposit the required amount of solder in the seam.

4. The method of soldering the seams of sheet metal containers, comprising in combination, the steps of providing a bath of molten solder, projecting a jet of molten solder upwardly into space from said solder bath at a predetermined velocity, maintaining a uniform hydrostatic head in the solder bath to keep the solder trajectory constant, and feeding a sheet metal container above said solder bath at a rate of travel substantially equal to the movement of solder particles in said solder trajectory by passing the container seam in the general direction of and substantially tangent to said solder trajectory to insure deposit of only the required amount of solder in the seam.

5. In an apparatus for soldering seams of sheet metal containers, the combination of a horn for supporting the containers, means for advancing the containers along said horn, a solder reservoir located adjacent said horn for holding molten solder, a nozzle connected with said reservoir for projecting molten solder into space and longitudinally of said horn in the same general direction as the movement of the containers so that the solder trajectory reaches into and is tangent to the path of the seams of the passing containers to effect deposit of solder in the seam, pump means located in said solder reservoir for forcing molten solder through said nozzle, and overflow means located in said reservoir for maintaining a uniform nozzle pressure to hold the desired shape of solder trajectory.

LYMAN L. JONES.
JOHAN B. YSTROM.

REFERENCES CITED

The following references are of record in the file of this patent:

UNITED STATES PATENTS

| Number | Name | Date |
|---|---|---|
| 370,404 | Norton | Sept. 27, 1887 |
| 485,906 | Brown | Nov. 8, 1892 |
| 949,722 | Abrams | Feb. 15, 1910 |
| 1,172,906 | Robinson | Feb. 22, 1916 |
| 1,193,425 | Robinson | Aug. 1, 1916 |
| 1,223,777 | Eby | Apr. 24, 1917 |
| 1,869,224 | Scarritt | July 26, 1932 |
| 1,935,646 | Luthi | Nov. 21, 1933 |
| 2,193,955 | Neisenburg | Mar. 19, 1940 |
| 2,221,367 | Bishop | Nov. 12, 1940 |
| 2,370,671 | Krueger | Mar. 6, 1945 |

FOREIGN PATENTS

| Number | Country | Date |
|---|---|---|
| 279,584 | Great Britain | June 27, 1927 |